3,475,435
MULCHING PROCESS
Raymond Ernest Rothfelder, La Crescenta, Calif., assignor to W. R. Grace & Co., New York, N.Y., a corporation of Connecticut
Original application Aug. 12, 1964, Ser. No. 389,005, now abandoned. Divided and this application Jan. 20, 1967, Ser. No. 627,578
Int. Cl. A01g 13/02
U.S. Cl. 111—1                    2 Claims

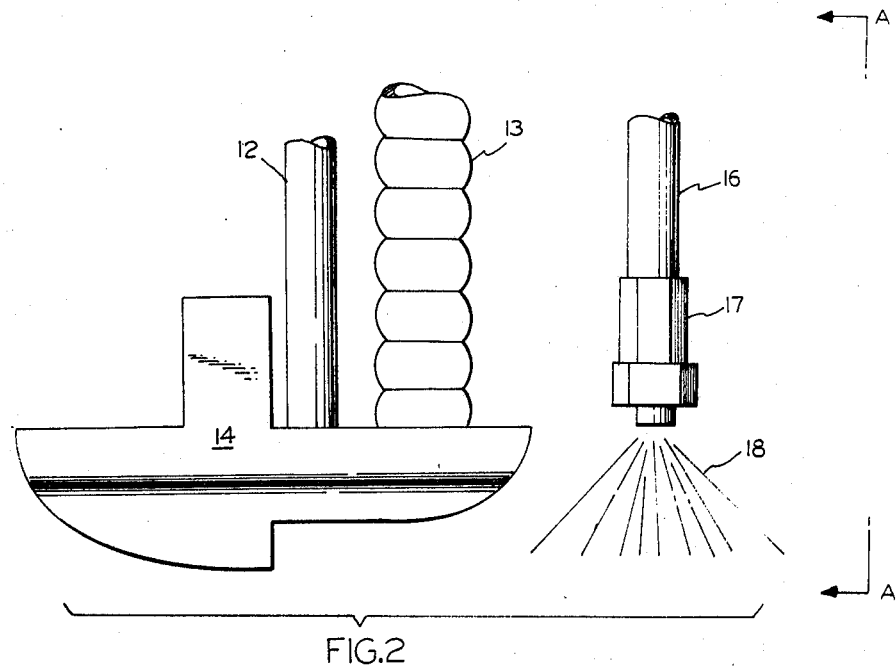
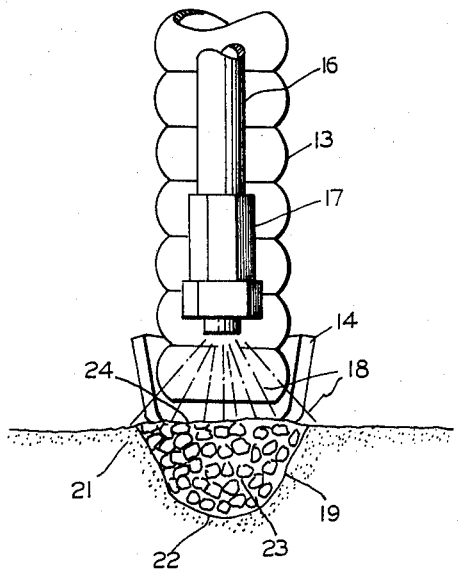
FIG.2
FIG.3

ABSTRACT OF THE DISCLOSURE

As an agricultural mulch or growing medium, a granular material such as vermiculite is applied over a seed in a furrow and then coated with a binder. Plant germination and emergence are promoted by the improved environment thus provided.

---

Figure 1:
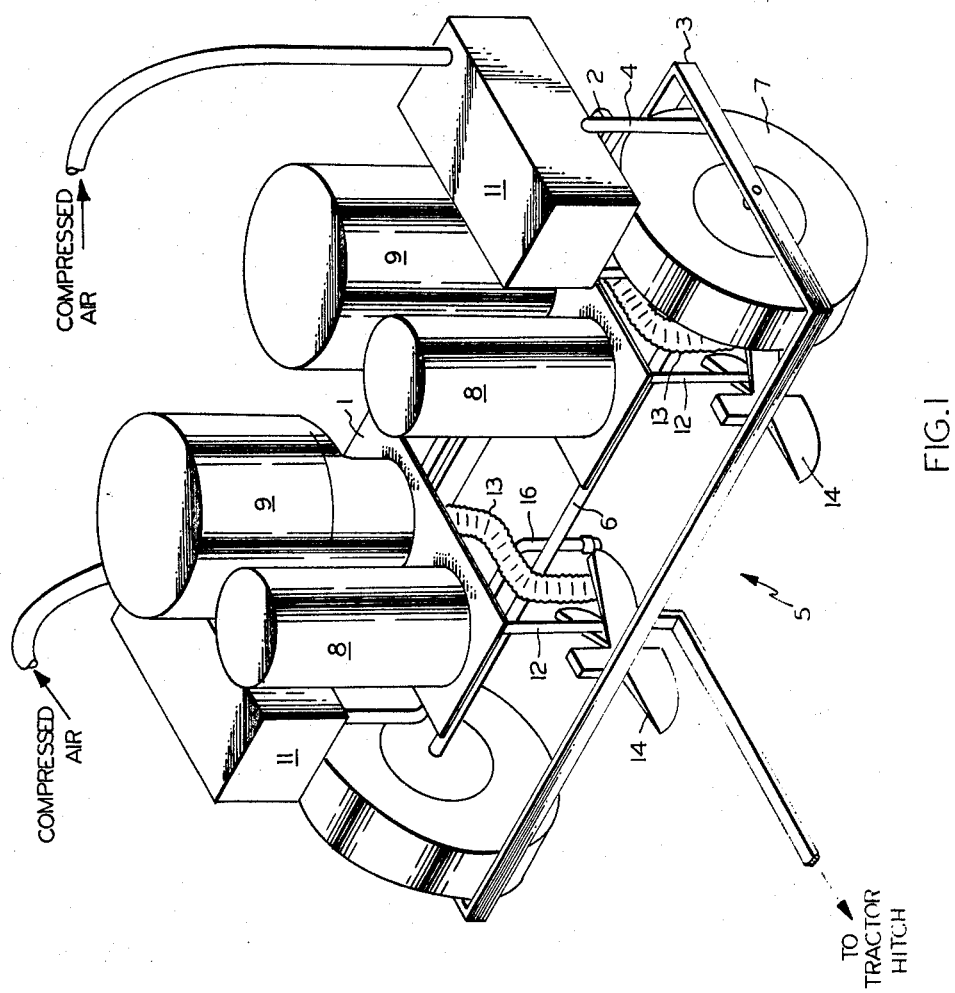

This application is a division of Ser. No. 389,005, filed Aug. 12, 1964, and now abandoned.

This invention relates to agricultural mulches. In one specific aspect it relates to a vermiculite-polyvinyl acetate agricultural mulch.

Mulches are materials applied to the surface of the soil to prevent the loss of water by evaporation, to keep down the growth of weeds, to increase soil temperatures and to prevent the crusting of the surface of the soil.

In another aspect the invention relates to a protective medium and environment for germination and growth of the seed.

Crusting can prevent the emergence of a germinating seedling. Vermiculite and other granular materials such as sawdust, perlite, rice hulls, peanut shells and the like have been used as mulch covers to eliminate crusting. A drawback to the use of these materials under normal field condition is that they can be blown or washed out of the seed furrow leaving the seed exposed. A variety of binders such as asphalt, starches, protein glues, clays, natural gums etc. have been applied to the surface of these mulches materials to bind the particles together. However, these binders have drawbacks.

In the case of clays, natural gums, starches and the like, there is a tendency for the binder film to shrink and expose the covering mulch to the elements. Binders such as emulsified asphalt are frequently kept liquid by the heat of the sun so as to be absorbed by the mulch and reduce their efficiency as binders. Asphalt emulsions are not particularly stable; they break rapidly and are difficult to clean out of equipment.

It is therefore an object of this invention to provide an agricultural mulch that will remain in place and not interfere with growth of seedlings.

It is another object to provide an agricultural mulch that drys rapidly and does not shrink.

These and other objects of this invention will become apparent from the detailed description and specific examples and drawing wherein: FIG. 1 depicts a typical seed planting apparatus modified in accordance with the present invention; and FIG. 2 is a detailed view of the modifications; and FIG. 3 is a cross sectional view through A—A of FIG. 2.

Broadly this invention contemplates the use of vermiculite and a binder therefor whereby the vermiculite fills the furrow in which the seed in planted and the binder is applied over the vermiculite. In the practice of this invention a seeded furrow is filled with vermiculite and the surface of the vermiculite is sprayed with aqueous polyvinyl acetate (hereinafter termed PVA) or polyvinyl alcohol which drys to bond the vermiculite particles together. The vermiculite particles are held tightly by the PVA and prevented from being blown or washed away. The seedling emerges by breaking through or pushing aside the PVA-vermiculite mulch.

It should be understood that the detailed description and specific example which indicate preferred embodiments of the invention are given by way of illustration only. Various changes and modifications within the spirit and scope of the invention will become apparent to those skilled in the art from the detailed description.

Referring now to FIG. 1, a seed planter shown generally at 5 is provided with support platform 1, mounted on a horizontal support 2, and connected to the frame 3, via support member 4. The frame 3 is connected to axle 6, which is supported by wheel 7. Supportedly mounted on the support platform 1 are seed container 8 and vermiculite hopper 9. Polyvinyl acetate emulsion tank 11 is supportedly mounted on the horizontal support 2. Seed conduit 12 and vermiculite conduit 13 are supported by and internally connected to the seed container 8 and vermiculite hopper 9 respectively and are anterior to planter shoe 14. PVA emulsion conduit 16 is supported by and internally connected to the PVA tank 11 and is anterior to the vermiculite conduit 13. The planter shoe 14 is supportedly connected to the frame 3.

FIG. 2 is a more detailed view of the planter shoe 14, the seed conduit 12, the vermiculite conduit 13 and the PVA emulsion conduit 16. At the end of the PVA conduit 16 is a spray nozzle 17 for the application of the PVA emulsion 18.

The application of the PVA emulsion 18 is depicted in FIG. 3 wherein a furrow 19 has been formed in the soil 21 by the planter shoe 14. A seed 22 deposited via seed conduit 12 (not shown in FIG. 3) in the furrow 19 is covered by vermiculite 23, dropped into the furrow 19 via vermiculite conduit 13. The vermiculite 23 fills the furrow 19. PVA emulsion 18 is discharged from nozzle 17 and binds the surface of the vermiculite 23.

In the application of this invention a seed planter 5, which may be a conventional corn planter, is towed through the planting area. The planter shoe 14 forms a furrow 19 in the soil 21, the depth of the furrow 19 being determined by the nature of the crop to be grown. Planter shoe 14 may be adjusted accordingly by means not shown. A seed 22 (or seeds if more than one are necessary for proper crop propagation) is dropped in the furrow 19 by delivery conduit 12 which is internally connected to seed container 8. In some commercial seed planters the seed conduit forms an integral part of the planter shoe. The position of the seed container 8 shown on supporting platform 1 is not a limitation upon the invention. The seed container 8 can be mounted wherever it is most convenient and is not restricted to the location shown.

Following the depositing of the seed 22, vermiculite 23 is dropped at a predetermined rate into the furrow 19 on top of the seed, the amount of vermiculite depending upon the depth of the furrow 19. The location of the vermiculite conduit 13 is anterior to the seed conduit and may be rigid or flexible. The vermiculite hopper 9 is not restricted to the location shown in FIG. 1, but may be mounted wherever convenient.

When the furrow 19 is filled with vermiculite 23, PVA emulsion 18 is sprayed onto the vermiculite 23 to form, upon drying, a PVA-vermiculite mulch. The PVA emulsion spray nozzle 17 can be a conventional flat jet spray nozzle. The nozzle 17 should be adjustable so that it will cover the vermiculite 23 and overlap onto the soil 21 on either side of the furrow 19. The PVA emulsion tank 11 is not restricted to the location shown and may even be mounted on the tractor itself. Since the PVA emulsion 18 is liquid it is necessary that it be sprayed under pressure, a convenient way of doing this being to maintain a suitable pressure in PVA tank 11.

The amount of PVA spray 18 can be regulated by varying the pressure on the PVA tank 18 or by a suitable flow control means in the PVA conduit 16.

In summary, proper application of the vermiculite-PVA mulch requires: (1) dropping the seed 22 in the furrow 19 at the normal planting depth; (2) covering the seed 22 by filling the furrow 19 with vermiculite 23; and (3) spraying the PVA emulsion 18 over the surface of the vermiculite furrow 19 in a band just wide enough to cover the vermiculite 23 and overlay the soil 21 on each side.

Both the vermiculite 23 and polyvinyl acetate used are standard items of commerce. The vermiculite 23 is preferably in the exfoliated form.

It is within the scope of this invention that other granular materials such as sawdust, perlite, rice hulls, peanut shells and the like may be used as a mulch. The choice of PVA should be based on the wet strength or ability to resist solution after drying and its ability to stay in suspension at low solids content.

The strength of the PVA-vermiculite surface layer 24 should be sufficient to withstand the action of wind and sprinkler irrigation for up to about two weeks, but weak enough so an emerging seedling can break through or push it aside. It is not desirable for the seedling to dissipate its strength in emerging through the PVA-vermiculite mulch. The surface layer 24 itself is very permeable to both water and gases.

The solids content of the PVA emulsion 18 may be from about 10 to about 15%; preferably from about 11 to 13%. The solid content of less than 10% does not provide a sufficiently strong film, while those above 15% produce films of greater strength than necessary.

It is within the scope of this invention that a plant protecting chemical such as an insecticide or fungicide be added to either the PVA emulsion 18 or the vermiculite 23 or separately to prevent insect or disease damage while the seedling emerges. The insecticide can be any of the usual soil insecticides or preferably a systemic material which will be taken up by the plant and protect the seedling for a month or more.

The invention is illustrated, but not limited by the following specific example:

EXAMPLE I

The emergence of lettuce seeds under various soil treatments

Lettuce seeds were treated with seven different mulch or soil treatments as follows:

(1) Vermiculite-PVA mulch
(2) Polybutene (petroleum mulch)
(3) Commercial polyacrylate soil conditioner
(4) Paper strips—seed glued to paper strip
(5) Paper cones with seeds glued inside
(6) Paper cones with seedlings glued inside
(7) Manure
(8) Control (no soil treatment).

In all tests, the soil depth was approximately ¼ inch. In test No. 1 the furrow was formed and the seed, vermiculite, and PVA emulsion were deposited as described above.

In tests No. 2 and 3 the furrow was formed, the seed placed in it and covered with the soil. The mulch was applied to the surface of the soil.

In test No. 4 the paper strips were folded in half with the seeds on the inside and then pressed into the soil.

In tests No. 5 and 6 the paper cones were flattened with the seeds or seedlings on the inside and pressed into the soil.

In test No. 7 the manure was worked into the soil immediately above the seed.

Each test consisted of 50 lettuce seeds and the effectiveness of the seed treatment was determined by the percent emergence. Each test was run in quadruplet and the results are shown in Table I.

TABLE I

| Test Number | Soil Treatment | Number of Seedlings Emerged | | | | Average Emergence | Percent Emergence |
| --- | --- | --- | --- | --- | --- | --- | --- |
| | | 1 | 2 | 3 | 4 | | |
| 1 | Polyvinyl acetate-vermiculite mulch | 48 | 43 | 46 | 50 | 47 | 94 |
| 2 | Polybutene | 43 | 26 | 36 | 25 | 39 | 78 |
| 3 | Polyacrylate | 40 | 35 | 25 | 27 | 32 | 64 |
| 4 | Paper Strips | 0 | 0 | 28 | 26 | 14 | 27 |
| 5 | Paper Cones with Seeds | 11 | 19 | 18 | 19 | 17 | 34 |
| 6 | Paper Cones with Seedlings | 19 | 10 | 7 | 3 | 10 | 20 |
| 7 | Manure | 22 | 14 | 21 | 21 | 20 | 40 |
| 8 | Control (No Treatment) | 25 | 18 | 29 | 21 | 23 | 46 |

From the foregoing detailed description and example, it can readily be seen that the vermiculite-PVA film mulch provides a better and more uniform environment for seed generation and emergence. This is accomplished by, (1) the elimination of crusting and reduction in weight on top of the seed (2), the elimination of variations on soil type and texture, (3) by providing a uniform material with which to cover the seed, and (4) by providing quicker seed germination through better exchange of moisture and gases.

What is claimed is:

1. A method for promoting the emergence of seed consisting essentially of depositing the seed in a soil furrow, filling said furrow with exfoliated vermiculite, and applying a continuous stream of polyvinyl acetate emulsion having a solids content of from about 10 to about 15% to the surface of said vermiculite and the soil on each side of said furrow, thereby forming a bonded polyvinyl acetate-vermiculite layer.

2. The method according to claim 1 wherein the solid content of the polyvinyl acetate emulsion is from 11 to 13%.

References Cited

UNITED STATES PATENTS

| | | |
| --- | --- | --- |
| 1,882,377 | 10/1932 | Whittelsey. |
| 2,785,969 | 3/1957 | Clawson _____ 47—56 |
| 2,909,869 | 10/1959 | Dresser. |
| 3,077,054 | 2/1963 | Niemeijer _____ 47—9 |

ROBERT E. BAGWILL, Primary Examiner

U.S. Cl. X.R.

47—9